United States Patent
Nishikawa et al.

(10) Patent No.: US 8,565,097 B2
(45) Date of Patent: Oct. 22, 2013

(54) FRAME TRANSFER APPARATUS AND FRAME TRANSFER METHOD

(75) Inventors: Shin Nishikawa, Yokohama (JP);
Takanori Yaginuma, Chigasaki (JP);
Shinichiro Saito, Kawasaki (JP);
Katsunori Murase, Yokohama (JP);
Hisaya Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 13/071,253

(22) Filed: Mar. 24, 2011

(65) Prior Publication Data

US 2011/0249562 A1    Oct. 13, 2011

(30) Foreign Application Priority Data

Apr. 9, 2010 (JP) ................................ 2010-090249

(51) Int. Cl.
*H04J 1/16* (2006.01)
*H04L 12/28* (2006.01)

(52) U.S. Cl.
USPC ............ 370/241; 370/254; 370/392; 709/224

(58) Field of Classification Search
USPC ......... 370/230, 235, 241, 242, 389, 392, 223, 370/224, 248, 254
See application file for complete search history.

(56) References Cited

U.S. PATENT DOCUMENTS

| | | | |
|---|---|---|---|
| 2008/0141359 A1* | 6/2008 | Lee et al. | 726/13 |
| 2008/0225856 A1* | 9/2008 | Kawamura | 370/395.3 |
| 2008/0310421 A1* | 12/2008 | Teisberg et al. | 370/395.53 |
| 2009/0022081 A1* | 1/2009 | Hagiwara et al. | 370/315 |
| 2010/0235665 A1* | 9/2010 | Diab | 713/323 |
| 2012/0230196 A1* | 9/2012 | Jain et al. | 370/235 |
| 2012/0250518 A1* | 10/2012 | Diab | 370/241 |
| 2013/0158729 A1* | 6/2013 | Ghose et al. | 700/286 |
| 2013/0166788 A1* | 6/2013 | Katano et al. | 710/15 |

FOREIGN PATENT DOCUMENTS

JP    2008-172381    7/2008

* cited by examiner

*Primary Examiner* — Andrew Lee
(74) *Attorney, Agent, or Firm* — Foley & Lardner LLP

(57) ABSTRACT

It is intended to provide a frame transfer apparatus for transferring an LLDP frame to reduce a traffic load of the LLDP frame periodically sent for survival confirmation. The frame transfer apparatus within a network sends the LLDP frame by converting a TTL of the LLDP frame to be transferred to its maximum value of 65535. Also, the frame transfer apparatus makes the survival confirmation for a terminal, and sends as proxy the LLDP frame in which the TTL is set to 0, in place of the terminal, at a moment of expiration of the TTL, whereby the disconnection of the terminal from the network is appropriately notified to the other terminals. Thereby, the load of the LLDP frame periodically sent for survival confirmation within the network can be reduced.

10 Claims, 12 Drawing Sheets

| | 401 | 402 | 403 | 404 | 405 | 406 | 407 |
|---|---|---|---|---|---|---|---|
| | ENTRY NO | DEVICE ID | RECEIVING PORT | SOURCE MAC ADDRESS | DEVICE INFORMATION | TTL TIMER | SENDING TIMER |
| 408 | 1 | ID A | PORT 1 | MAC A | A | 180 SEC. | 65500 SEC. |
| 409 | 2 | ID B | PORT 2 | MAC B | B | 120 SEC. | 43022 SEC. |
| 410 | 3 | ID C | PORT 3 | MAC C | C | 90 SEC. | 20000 SEC. |
| | ⋮ | ⋮ | | ⋮ | | | |

FIG. 5

FRAME TRANSFER APPARATUS AND FRAME TRANSFER METHOD

CLAIM OF PRIORITY

The present application claims priority from Japanese patent application JP 2010-090249 filed on Apr. 9, 2010, the contents of which are hereby incorporated by reference into this application.

BACKGROUND OF THE INVENTION

1. Field of the Invention

The present invention relates to a frame transfer apparatus and a frame transfer method, and more particularly to a frame transfer apparatus and a frame transfer method within a network system in which device information is transmitted in multicast at an L2 layer.

2. Description of the Related Art

While various terminals are connected to a network, and the inside of a Local Area Network (LAN) is more complicated, a method for automatically collecting information of terminals or the like within the network, or an Link Local Discovery Protocol (LLDP) has been devised by an IEEE 802.1AB.

The LLDP is used within the LAN as a protocol of a link layer (L2 layer). Each terminal and a frame transfer apparatus within the network sends its own device information as an LLDP frame to a destination multicast address over the network. If the frame transfer apparatus receives a frame of the destination multicast address, the frame is transferred to every port except for a reception port. Therefore, an LLDP frame sent from each terminal and the frame transfer apparatus is delivered to all the terminals within the network. Thereby, the information of each terminal within the network can be automatically collected by collecting the LLDP frame sent by each terminal and the frame transfer apparatus. Also, a Time To Live (TTL) is defined in the LLDP, whereby each terminal for sending the LLDP frame can make a survival confirmation for the terminal by sending the LLDP frame at a shorter period than the TTL.

In the LLDP, a multicast address is designated in a destination MAC address of the LLDP frame. Therefore, the LLDP frame is sent to a terminal not needing to receive the LLDP frame, unnecessarily pressing a network band. Also, in an IEEE802.1d as defined before the IEEE802.1AB, the MAC address of destination multicast defined by the IEEE802.1AB is provided in an address range subjected to frame destruction. Therefore, there is a problem that if a frame transfer apparatus not supporting the IEEE802.1AB is present within the network, the LLDP frame does not arrive at the terminal connected to the frame transfer apparatus. To improve this problem, the frame transfer apparatus for transferring the LLDP frame in which the destination MAC address is converted from the multicast address to a unicast address is disclosed in JP-A-2008-172381. Thereby, it is possible to send the LLDP frame to only the terminal needing to receive the LLDP frame, preventing the network band from being pressed due to unnecessary LLDP frame. Also, if a bridge not supporting the IEEE802.1AB is present within the network, it is possible to send the LLDP frame to the terminal connected to the concerned bridge as well, because the unicast address is designated in the destination MAC address.

SUMMARY OF THE INVENTION

With the technology of JP-A-2008-172381, when all the terminals within the network need to receive the LLDP frame, a load of network band is no more than where the multicast address is designated. However, a terminal load of the frame transfer apparatus that converts the destination MAC address of the LLDP frame increases in proportion to the number of terminals interconnected.

In the IEEE802.1AB, the TTL of the LLDP frame can be set in a range from 0 to 65535 seconds, in which the shorter the TTL of the LLDP frame, the shorter a sending period for survival confirmation, so that a traffic load within the network increases. Therefore, a method of making the TTL longer to lengthen the sending period of the LLDP frame, and reduce the traffic load of the LLDP frame can be considered. However, with the above method, when the terminal having sent the LLDP frame secedes from the network, there is a longer error time until perceiving it.

In the light of the above-mentioned problems, an object of the invention is to provide a frame transfer apparatus and a frame transfer method in which an LLDP frame of a terminal is sent as proxy at an appropriate timing by suppressing a periodic transfer of the LLDP frame that each terminal sends for survival confirmation, to reduce a traffic load within a network.

The frame transfer apparatus of the invention sends the LLDP frame by changing a TTL for use in transferring the LLDP frame to its maximum value of 65535 seconds. Therefore, it is unnecessary that a terminal having received the concerned LLDP frame receives the LLDP frame for survival confirmation for a period of 65535 seconds. Also, when a terminal having sent the concerned LLDP frame secedes from the network, the frame transfer apparatus sends as proxy the LLDP frame in which the TTL is set to 0, in place of the sending terminal, at a moment of expiration of a TTL value before change for the concerned LLDP frame. Thereby, the disconnection of the concerned terminal can be appropriately notified to the other terminals. Also, when a terminal newly joins the network, device information of other than the concerned terminal held within the frame transfer apparatus is sent in unicast to the concerned terminal newly joining the network. Thereby, the terminal newly joining the network can promptly acquire the device information of the other terminal within the network.

According to the first solving means of this invention, there is provided a frame transfer apparatus in a network in which a device that is a terminal or the frame transfer apparatus within the network sends its own device information and each device acquires the device information of the other devices transferred by the frame transfer apparatus, the frame transfer apparatus comprising:

a receiving section for receiving a first frame including the device information of a first device and a predetermined first effective time of the device information from the first device;

a storage section for storing the device information of the first device and the first effective time in the received first frame;

a monitor section for confirming a survival of the first device by receiving the first frame again from the first device within the first effective time; and a sending section for sending a second frame including the device information of the first device and a second effective time that is longer than the first effective time to one or more second devices at time interval longer than the first effective time and shorter than the second effective time while the survival of the first device is confirmed.

According to the second solving means of this invention, there is provided a frame transfer apparatus in a network in which a device that is a terminal or the frame transfer apparatus in the network sends a frame for a survival confirmation of its own, and each device acquires the frame for the survival confirmation of the other devices transferred by the frame transfer apparatus, the frame transfer apparatus comprising:

a receiving section for receiving a first frame including a predetermined first effective time of the survival conformation from a first device;

a monitor section for confirming a survival of the first device by receiving the first frame again from the first device within the first effective time; and a sending section for sending a second frame including a second effective time of the survival conformation that is longer than the first effective time to one or more second devices at time interval longer than the first effective time and shorter than the second effective time while the survival of the first device is confirmed.

According to the third solving means of this invention, there is provided a frame transfer method in a network in which a device that is a terminal or the frame transfer apparatus within the network sends its own device information and each device acquires the device information of the other devices transferred by the frame transfer apparatus, the frame transfer method comprising the steps of:

receiving a first frame including the device information of a first device and a predetermined first effective time of the device information from the first device;

storing the device information of the first device and the first effective time in the received first frame;

confirming a survival of the first device by receiving the first frame again from the first device within the first effective time; and sending a second frame including the device information of the first device and a second effective time that is longer than the first effective time to one or more second devices at time interval longer than the first effective time and shorter than the second effective time while the survival of the first device is confirmed.

According to the invention, it is possible to provide a frame transfer apparatus and a frame transfer method in which an LLDP frame of a terminal is sent as proxy at an appropriate timing by suppressing a periodic transfer of the LLDP frame that each terminal sends for survival confirmation, to reduce a traffic load within a network.

BRIEF DESCRIPTION OF THE DRAWINGS

FIG. 5 shows an example of a device information table in the invention.

DETAILED DESCRIPTION OF THE PREFERRED EMBODIMENTS

Figure 1:
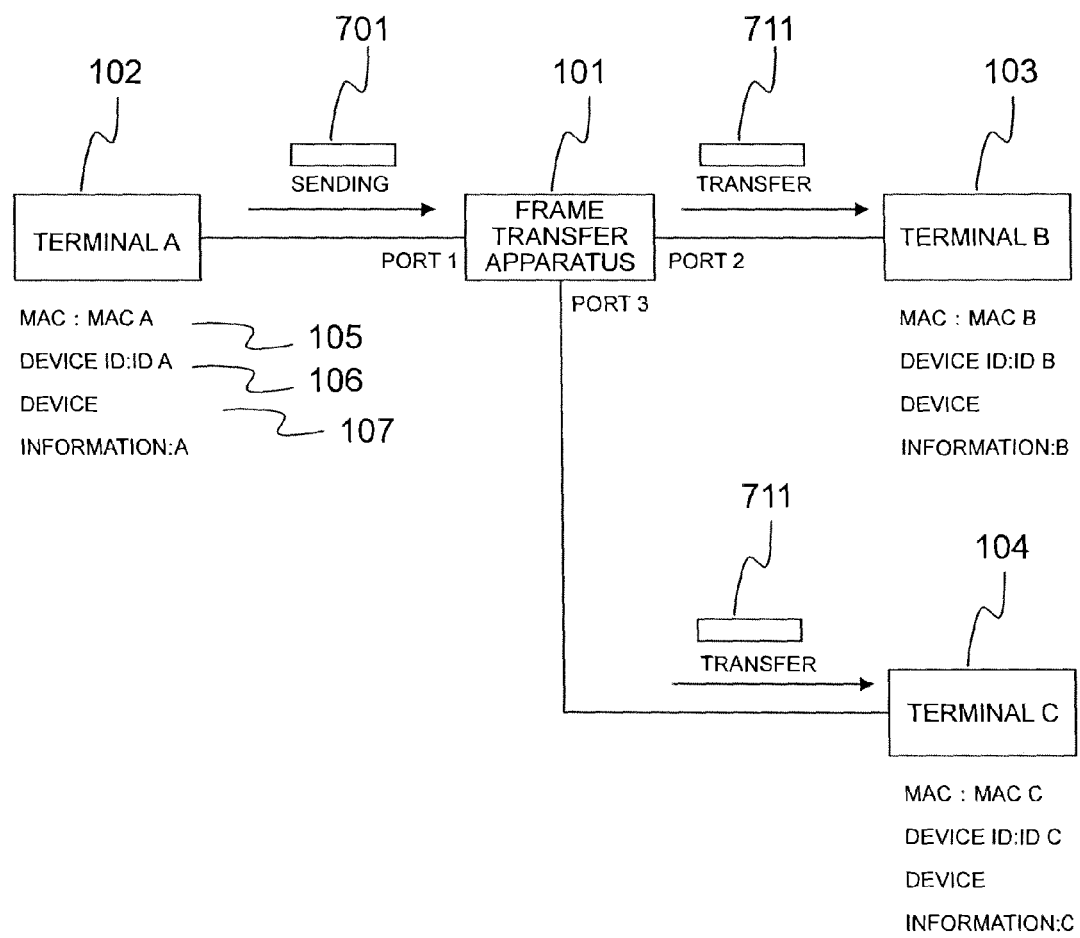
FIG. 1 is a hardware block diagram of a network system according to the present invention.

FIG. 1 is a hardware block diagram of a network system.

A network of this embodiment includes a frame transfer apparatus for transferring a Link Layer Discovery Protocol (LLDP) frame, and plural terminals for setting its own device information in the LLDP frame and sending it over the network. In FIG. 1, a frame transfer apparatus 101 for transferring the LLDP frame and terminals A102, B103 and C104 for sending the LLDP frame are shown. Each of the terminals A102, B103 and C104 has its own MAC address, a device ID for discriminating the device information in the LLDP, and the device information notified to the network. For example, the terminal A102 creates an LLDP frame 701 of FIG. 10 from its own MAC address (MAC A 105), the device ID (IDA 106), and the device information (A 107), and transmits it over the network. Though the LLDP frame 701 is sent from the terminal A102 alone in FIG. 1, all the devices supporting the LLDP, including the frame transfer apparatus, transmit the LLDP frame over the actual network. In this embodiment, the terminal and the frame transfer apparatus are collectively called simply as the device.

Figure 2:
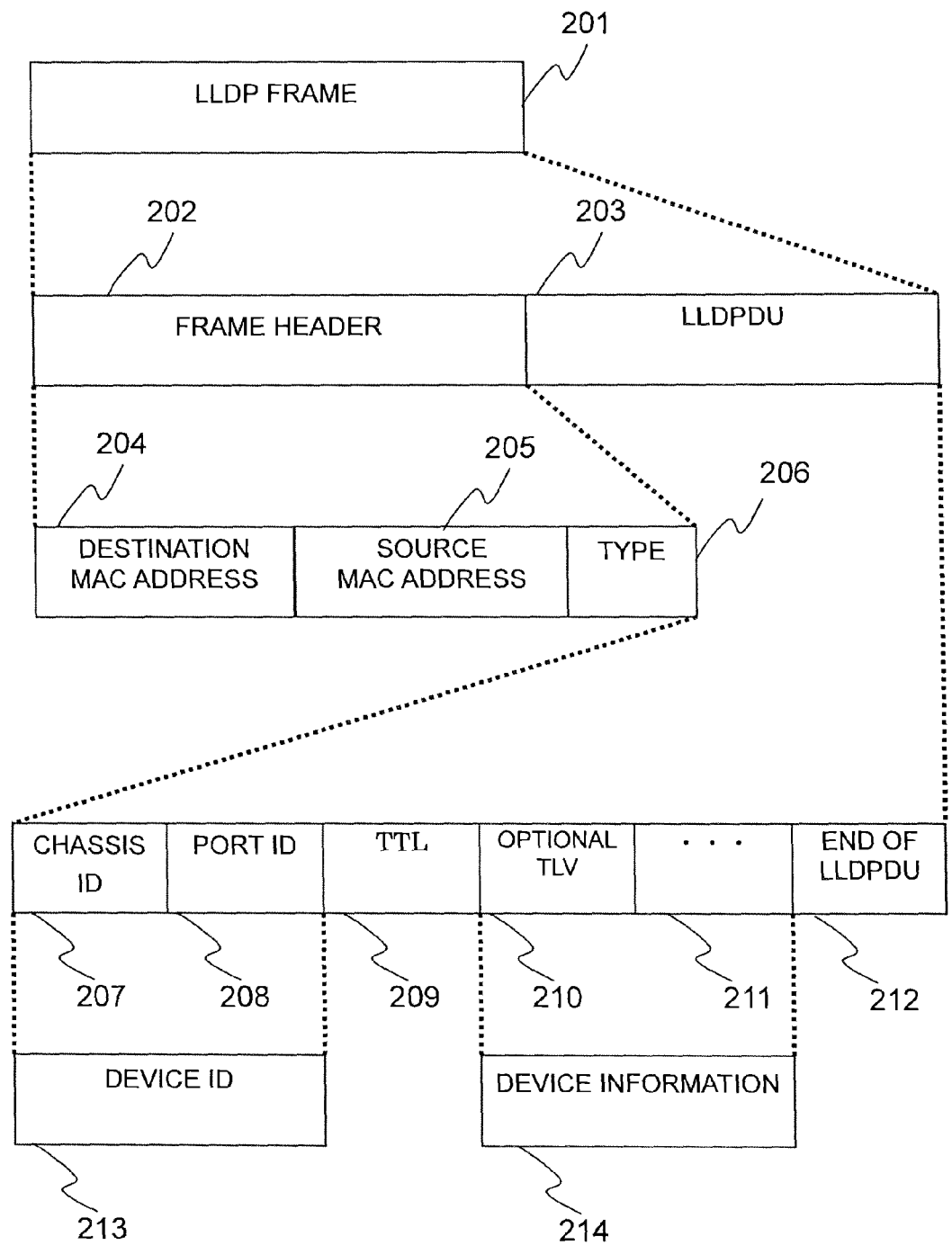
FIG. 2 is a format view of an LLDP frame in the invention.

Referring to FIG. 2, the contents of the LLDP frame will be described below. An LLDP frame 201 of FIG. 2 is composed of an LLDP header 202 and an LLDP Data Unit (LLDPDU) 203. The LLDP header 202 contains a destination MAC address 204, a source MAC address 205 and a Type 206. The destination MAC address 204 is set to a multicast address (01:80:C2:00:00:0E) prescribed in the LLDP, and the source MAC 205 is set to the MAC address of the terminal of the sender. Also, the Type 206 is set to 88CC indicating the LLDP.

The LLDPDU 203 is composed of type-length-values (TLVs) (207-212) defined in the LLDP. Each of a Chassis ID 207 and a Port ID 208 is set to a unique value capable of specifying the device information of the LLDP frame in combination of these two TLVs. For example, the MAC address of the terminal, or a unique local ID assigned to each terminal within the network is set. A setting item of the Chassis ID 207 and the Port ID 208 can be specified as subtype, in which what value to be set depends on the terminal for sending the LLDP frame. In this embodiment, the detailed description of the setting item and the set value of each TLV of the Chassis ID 207 and the Port ID 208 in the LLDP is omitted. The role of the Chassis ID 207 and the Port ID 208 is that the device information of the LLDP frame to be sent can be uniquely specified by combination of these two TLVs (207 and 208). Therefore, the combination of the two TLVs (207 and 208) is simply called a device ID 213 and the following description is made.

A TTL 209 is set to an effective term of information that is set in the LLDP frame. Optional TLVs (210 and 211) are set to the device information held by the terminal. The device information is settable to various kinds of information regarding the device such as the terminal or frame transfer apparatus, including the manufacture number of terminal, VLAN, ID, type, setting information and capability information. What kind of information is set depends on the system and terminal, and can be predetermined. Therefore, the detailed description of the Optional TLVs (210 and 211) is omitted, and the information set in the Optional TLVs (210 and 211) is simply treated as a device information 214 in the following description. Whether or not it is necessary to receive or use the delivered device information is judged by each terminal, but two or more terminals for receiving and processing the device information, for example, can exist within the network, in which such terminals (Manager) can grasp the physical connectivity (topology) within the network by analyzing the information such as a MAC address learning table for each port of the frame transfer apparatus acquiring it as the device information or the MAC address of each terminal.

Figure 4:
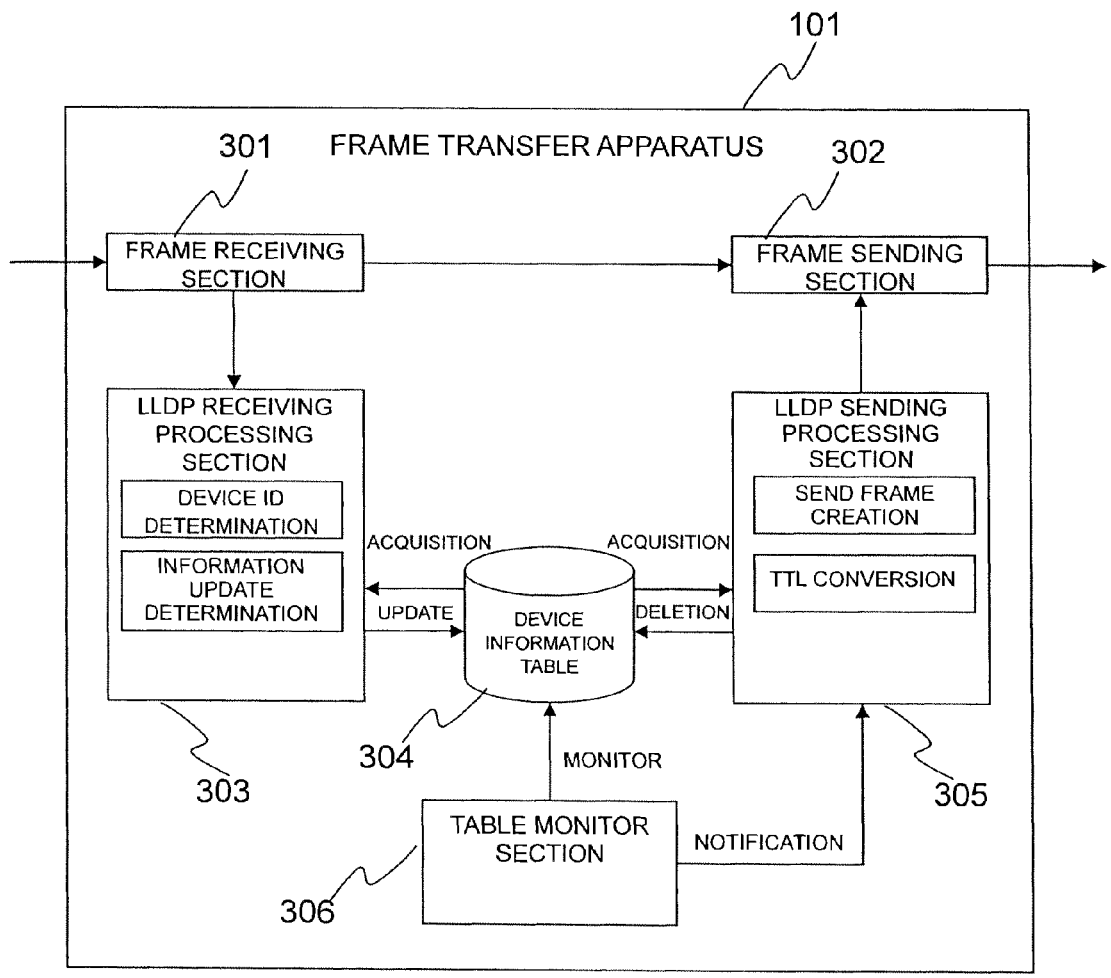
FIG. 4 is a configuration diagram of a frame transfer apparatus according to the invention.

Referring to FIG. 4, the configuration of the frame transfer apparatus according to this embodiment will be described below.

The frame transfer apparatus 101 includes a frame receiving section 301, a frame sending section 302, an LLDP receiving processing section 303, a device information table (storage section) 304, an LLDP sending processing section 305, and a table monitor section (monitor section) 306. In this embodiment, the frame receiving section 301 and the LLDP receiving processing section 303 are collectively called a receiving section and the frame sending section 302 and the LLDP sending processing section 305 are collectively called a sending section.

In the frame transfer apparatus of this embodiment, first of all, the frame receiving section 301 receives the LLDP frame 201. The frame receiving section 301 can receive the LLDP frame via each port for connection to the terminal or other frame transfer apparatus 101. The frame receiving section 301 determines whether or not the LLDP frame 201 is received by referring to the Type 206 of the LLDP header 202. If the received frame is not the LLDP frame 201, the frame sending section 302 directly transfers the frame. The frame sending section 302 outputs the frame from the port according to the frame destination. On the other hand, if the received frame is the LLDP frame 201, the LLDP receiving processing section 303 performs a receiving process for the LLDP frame 201.

The LLDP receiving processing section 303 makes an entry update and determination for the received LLDP frame 201 into the device information table 304 (as will be detailed later with reference to FIG. 5). Also, the LLDP receiving processing section 303 updates a TTL timer 406 of the concerned entry. If the transfer of the received LLDP frame 201 is needed in the LLDP receiving processing section 303, a sending timer 407 of the concerned entry is set up. By setting the sending timer of the concerned entry as timer expiration, the sending process for the concerned entry is promptly performed, so that the concerned LLDP frame 201 is sent.

In the device information table 304 as will be described later, a device information entry is held with the device ID 213 of the received LLDP frame 201 as a key. Also, each entry has the TTL timer 406 and the sending timer 407.

The table monitor section 306 monitors the device information table 304, and notifies a newly added entry and timer expiration entries of the TTL timer 406 and the sending timer 407 to the LLDP sending processing section 305.

The LLDP sending processing section 305 creates a send frame from the information of the concerned entry notified from the table monitor section 306. When it is created at a moment of expiration of the TTL timer 406 or expiration of the sending timer 407, the TTL 209 of the LLDP frame 201 is changed, and the frame sending section 302 sends the concerned LLDP frame 201. Also, the sending timer 407 for sending the LLDP frame at the next time is set up. Also, when the new entry is added, a device information entry other than the newly added entry in the device information table is sent in unicast to the terminal corresponding to the concerned new entry. For example, it is sent to the source MAC address of the concerned entry as the destination. Thereby, the terminal newly joining the network can promptly acquire the device information of the other terminal within the network.

Referring to FIG. 5, the contents of the entry and the timer held in the device information table 304 will be described below.

The device information table 304 holds information including an entry No (entry number, entry identifier) 401 of the table, a device ID 402, a reception Port 403 of the LLDP frame, a source MAC address 404 of the received LLDP frame and the device information 214 as one entry. Also, the TTL timer 406 and the sending timer 407 are set in each entry. When the TTL timer 406 or the sending timer 407 expires, the table monitor section 306 promptly notifies the LLDP sending processing section 305 to perform the sending process for the concerned entry.

Figure 6:
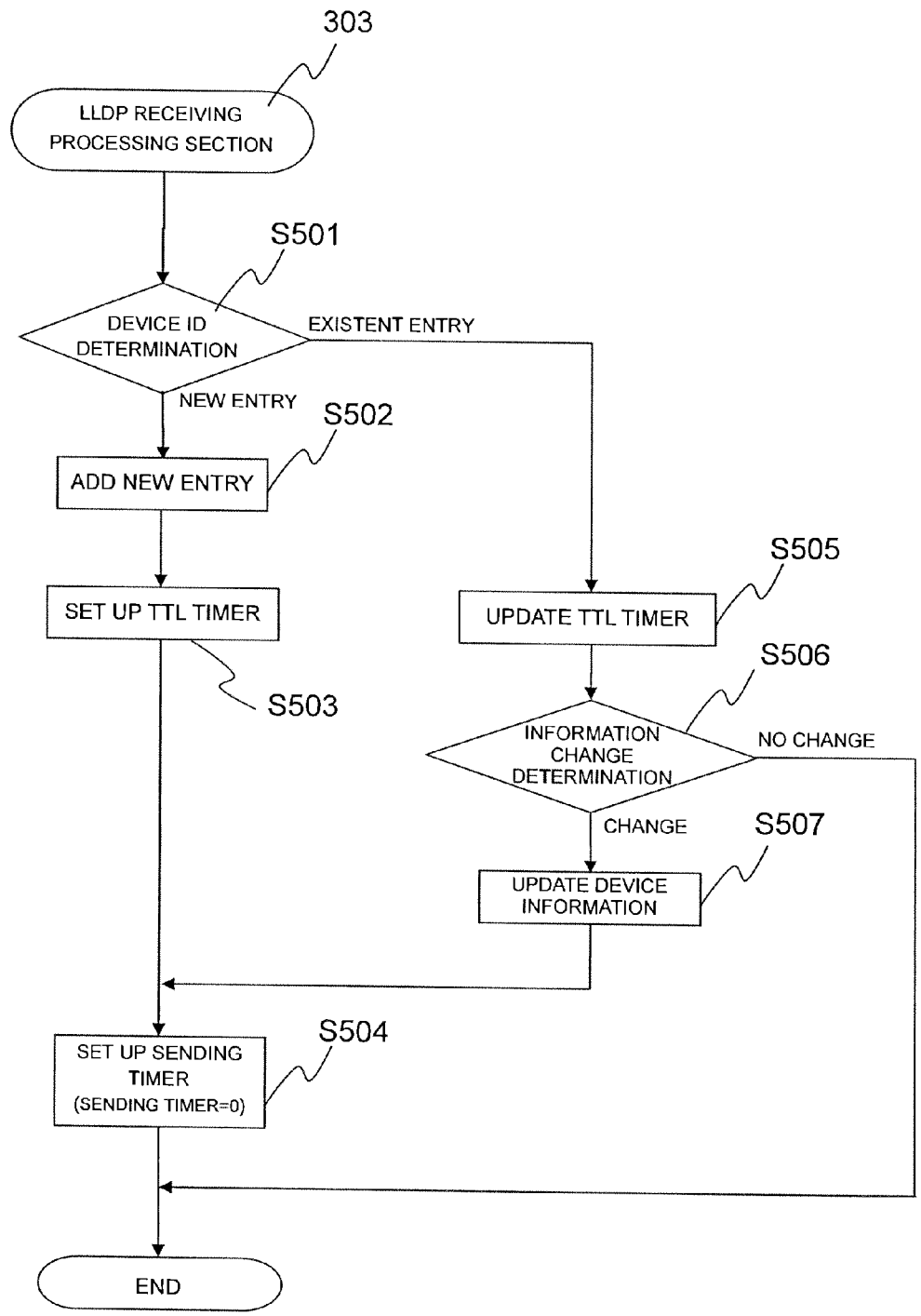
FIG. 6 is a flowchart of an LLDP receiving processing section in the invention.

Referring to FIG. 6, a process of the LLDP receiving processing section 303 will be described below.

The LLDP receiving processing section 303 determines whether or not the device ID 213 of the received LLDP frame 201 exists in the device information table 304 (S501). If the device ID 213 of the LLDP frame 201 is new information that does not exist in the device information table 304, the LLDP receiving processing section 303 adds a new entry to the device information table 304 (S502).

For example, the LLDP receiving processing section 303 extracts the device ID, source MAC address and device information from the received LLDP frame 201, and stores thereof in the new entry of the device information table 304. Also, the LLDP receiving processing section 303 stores the identification information of the reception port receiving the LLDP frame 201 in the above new entry of the device information table 304. Also, the TTL timer 406 of the added entry is set up with the TTL 209 of the received LLDP frame (S503). Since it is required to transfer the LLDP frame 201 of the newly added entry to the other terminal, the LLDP receiving processing section 303 sets the sending timer 407 of the concerned entry to 0 (timer expiration) (S504). Thereby, the concerned entry is promptly judged as timer expiration by the table monitor section 306, and the LLDP sending processing section 303 performs the sending process.

If the device ID 213 of the LLDP frame 201 exists in the device information table 304 (S501), the LLDP receiving processing section 303 updates the TTL timer 406 of the concerned entry with the TTL 209 of the LLDP frame 201 (S505). Also, the LLDP receiving processing section 303 compares the device information 214 of the LLDP frame 201 with device information 405 of the concerned entry, and determines whether or not the device information 214 is changed (S506). If the device information 214 is changed, the LLDP receiving processing section 303 updates the device information 405 of the concerned entry with the device information 214 of the received LLDP frame. If the device information of the concerned terminal is changed, it is required to notify the change to the other terminals. As an instance, supposing that the VLAN ID of the concerned terminal is changed, the other terminals need to promptly know the information to maintain the communication with the concerned terminal. Besides, how the device information of the concerned terminal is used depends on the system or the receiving side terminal, whereby the frame transfer apparatus 101 may not judge whether or not the change notification of that information is needed. Therefore, if the device information of the concerned terminal is changed, the sending timer 407 of the concerned entry is set to 0, and the sending process is promptly performed. On the other hand, if the device information 214 of the concerned terminal is not changed (S506), the sending process is not performed to suppress the unnecessary frame transfer and the process is directly ended. Also, if only the TTL 209 of the received LLDP frame 201 is changed in the above procedure, only the TTL timer 406 of the concerned entry is updated, and the transfer of the LLDP frame is not performed.

Though in the above example, the sending timer is set to 0 at the time of adding the new entry and updating the device information, the sending process may be performed at an earlier timing than the sending timing at the next time based on the sending timer.

Herein, a process of the table monitor section 306 (not shown) will be described below. The table monitor section 306 monitors the device information table 304, and notifies the entry No 401 of the entry in which the TTL timer 406 and the sending timer 407 expire to the LLDP sending processing section 305. Also, if the entry in which the sending timer 407 expires is the entry newly added to the device information table 304, the LLDP sending processing section 305 is notified that the entry is the newly added entry.

Figure 7:
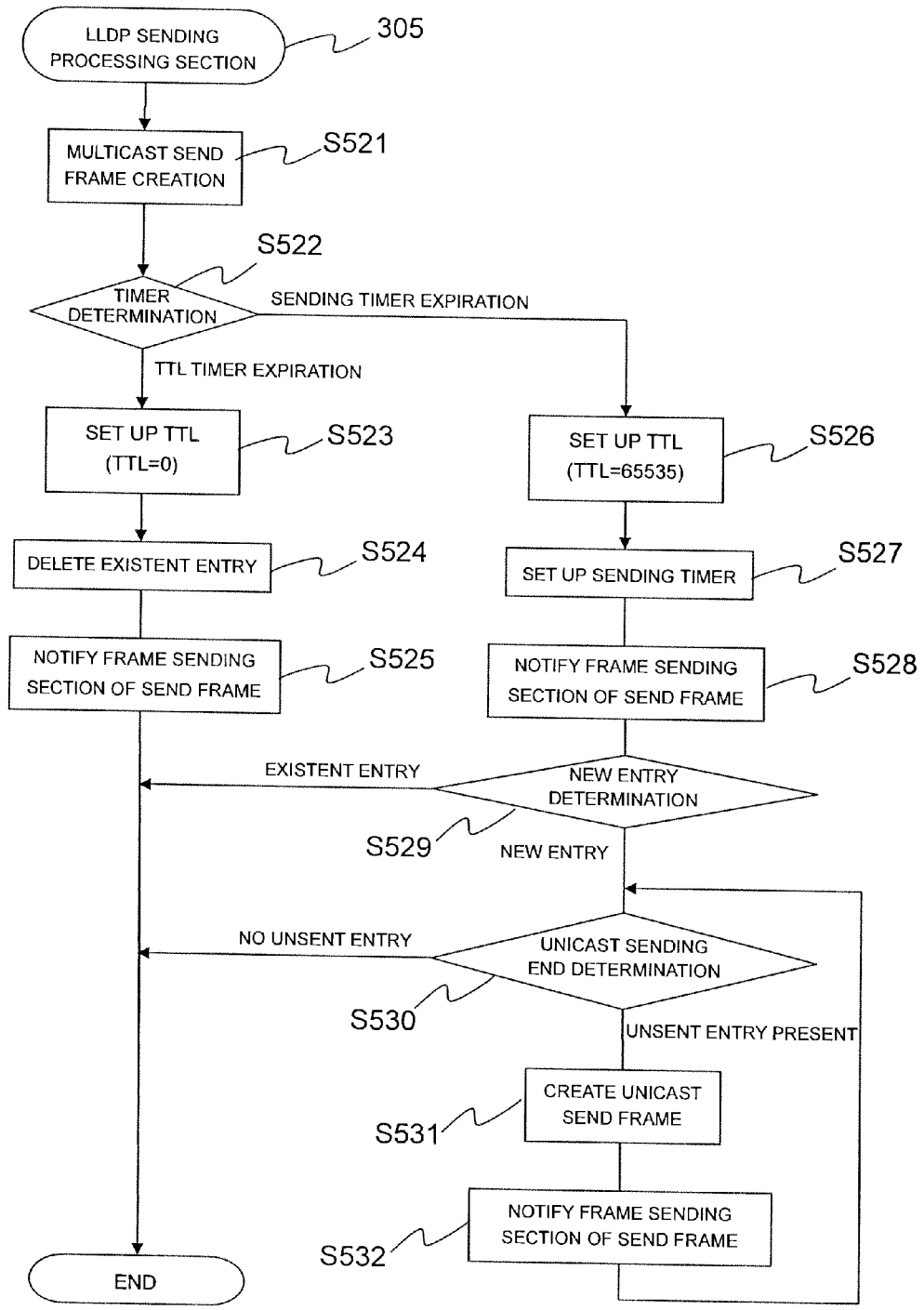
FIG. 7 is a flowchart of an LLDP sending processing section in the invention.

Referring to FIG. 7, a process of the LLDP sending processing section 305 will be described below.

The LLDP sending processing section 305 performs the sending process for the LLDP frame with the timer expiration entry notified from the table monitor section 306. First of all, the LLDP sending processing section 305 creates the LLDP frame 201 from the device ID 402, source MAC address 404, and device information 405 of the entry specified by the entry No notified from the table monitor section 306 (S521). These information can be acquired from the device information table 304. Also, the destination MAC address 204 of the LLDP frame 201 is set to the multicast address. The LLDP sending processing section 305 determines whether the timer of the concerned entry that has expired is the sending timer or the TTL timer (S522). If the concerned entry involves the expiration of the TTL timer 406, the TTL 209 of the LLDP frame 201 is set to 0 (S523), and the created send frame is notified to the frame sending section 302 (S525). Also, the LLDP sending processing section 305 deletes the concerned entry from the device information table 304 (S524).

On the other hand, if the concerned entry involves the expiration of the sending timer 407 (S522), the LLDP sending processing section 305 changes the TTL 209 of the LLDP frame 201 to the maximum value of 65535 (S526), and notifies the created send frame to the frame sending section 302 (S528). Also, the LLDP sending processing section 305 sets up the sending timer 407 of the concerned entry (S527). At this time, the sending timer 407 is set to, for example, a shorter time than 65535 that is set as the TTL 209 (however, a longer time than the TTL timer). Thereby, the LLDP frame can be sent at shorter intervals than the TTL.

When the TTL timer 406 and the sending timer 407 of the concerned entry expire at the same time, it can be considered that the concerned terminal has already seceded from the network. Therefore, not the LLDP frame in which the TTL 209 is set to 65535 for survival confirmation but the LLDP frame in which the TTL 209 is set to 0 to notify the disconnection of the concerned terminal is sent to the other terminals. Therefore, when the TTL timer 406 and the sending timer 407 of the concerned entry expire at the same time, the expiration of the TTL timer 406 may be given priority. The TTL 209 may be set to an appropriate time longer than the TTL of the received LLDP frame, rather than the maximum value of 65535 settable within the network.

Figure 3:
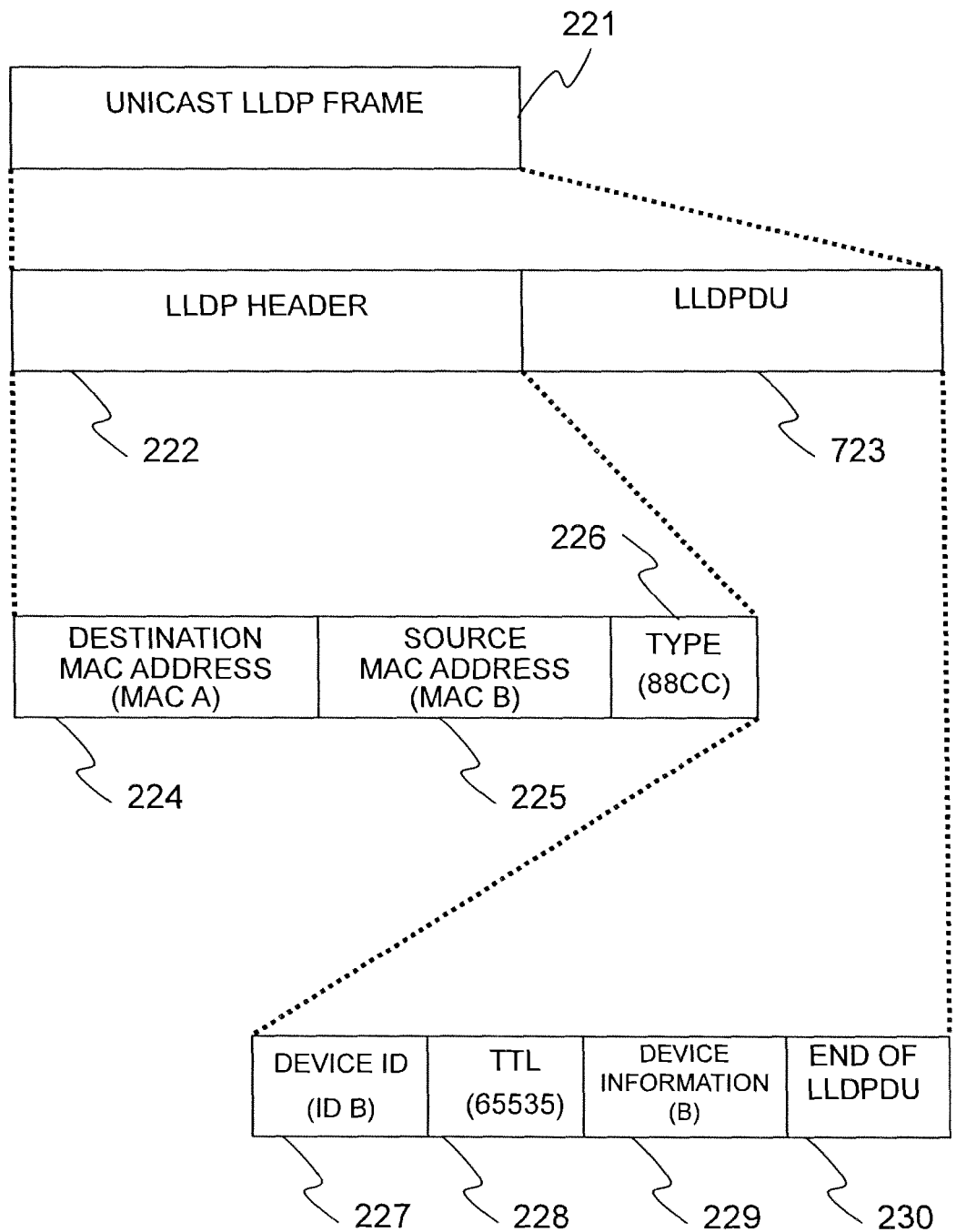
FIG. 3 shows an LLDP frame example in which a destination MAC address is a unicast address in the invention.

Also, if the entry notified from the table monitor section 306 is the newly added entry (S529), the frame sending section 302 sends in unicast the device information of the other terminal to the terminal of the concerned entry. In this case, the frame sending section 302 successively searches for any entry other than the concerned entry held in the device information table 304, creates a unicast LLDP frame including the information of each entry with the concerned terminal as the destination (S531), and notifies the created frame to the frame sending section 302 (S532). If searching the device information table 304 is completely ended, the process is ended as no unsent entry (S530). Thereby, the terminal newly joining the network can promptly acquire the device information of the other terminal within the network. In FIG. 3, as an instance, a unicast LLDP frame 0 in sending the entry 409 of the terminal B103 to the terminal A102 is shown.

The created LLDP frame 201 is sent by the frame sending section 302. On this occasion, when the destination MAC address of the concerned LLDP frame 201 is the multicast address, the frame is sent to all the ports other than the reception port 403 of the concerned entry.

Referring to FIGS. 8 to 12, an LLDP frame transfer sequence will be described below.

Figure 8:
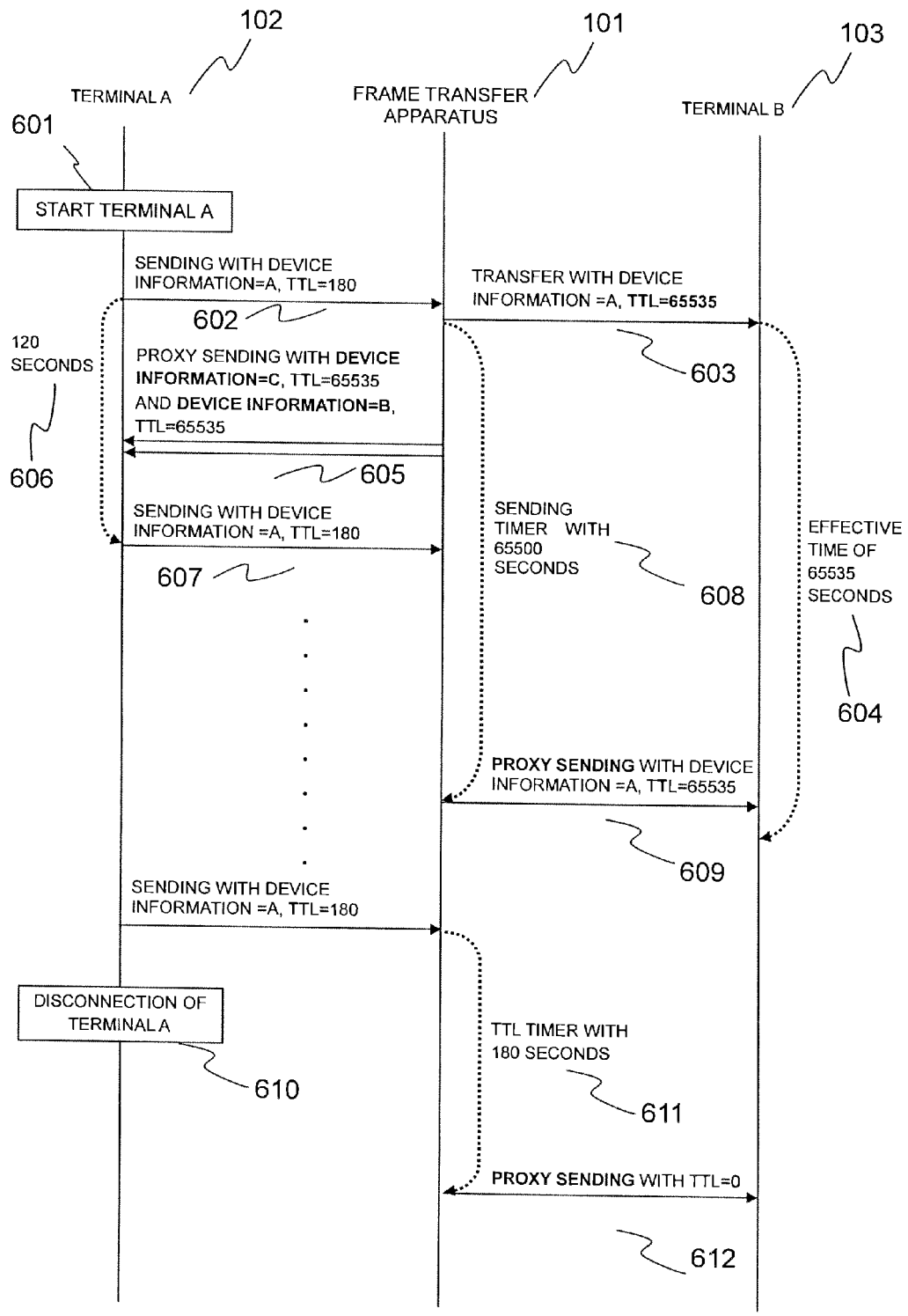
FIG. 8 is a view for explaining the sequence from start up of a terminal A to expiration of a TTL timer in the invention.
Figure 9:
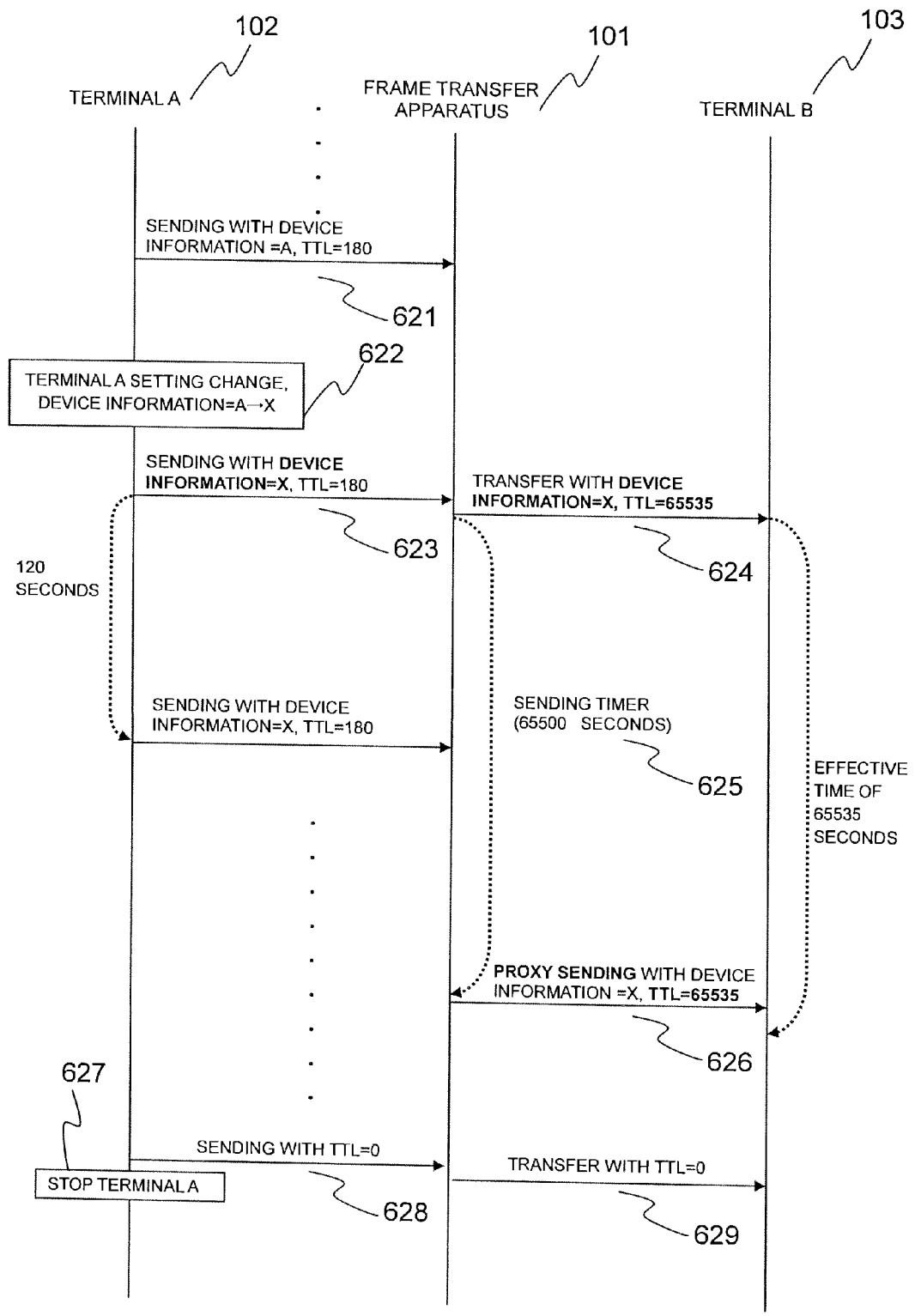
FIG. 9 is a view for explaining the sequence from update of information of the LLDP frame to stop of a device in the invention.

In FIGS. 8 and 9, the flow of the LLDP frame transferred from the terminal A102 to the terminal B103 in the network configuration of FIG. 1 is shown as the sequence. Also, though the flow of the LLDP frame to the terminal C104 is not shown in FIGS. 8 and 9, it is assumed that the LLDP frame transferred to the terminal B103 is transferred to the terminal C104 as well. This is also true in the case where the other frame transfer apparatus is connected.

Referring to FIG. 8, the transfer sequence of the LLDP frame since the terminal A102 is started (601) and newly joins the network will be described below.

Figure 10:
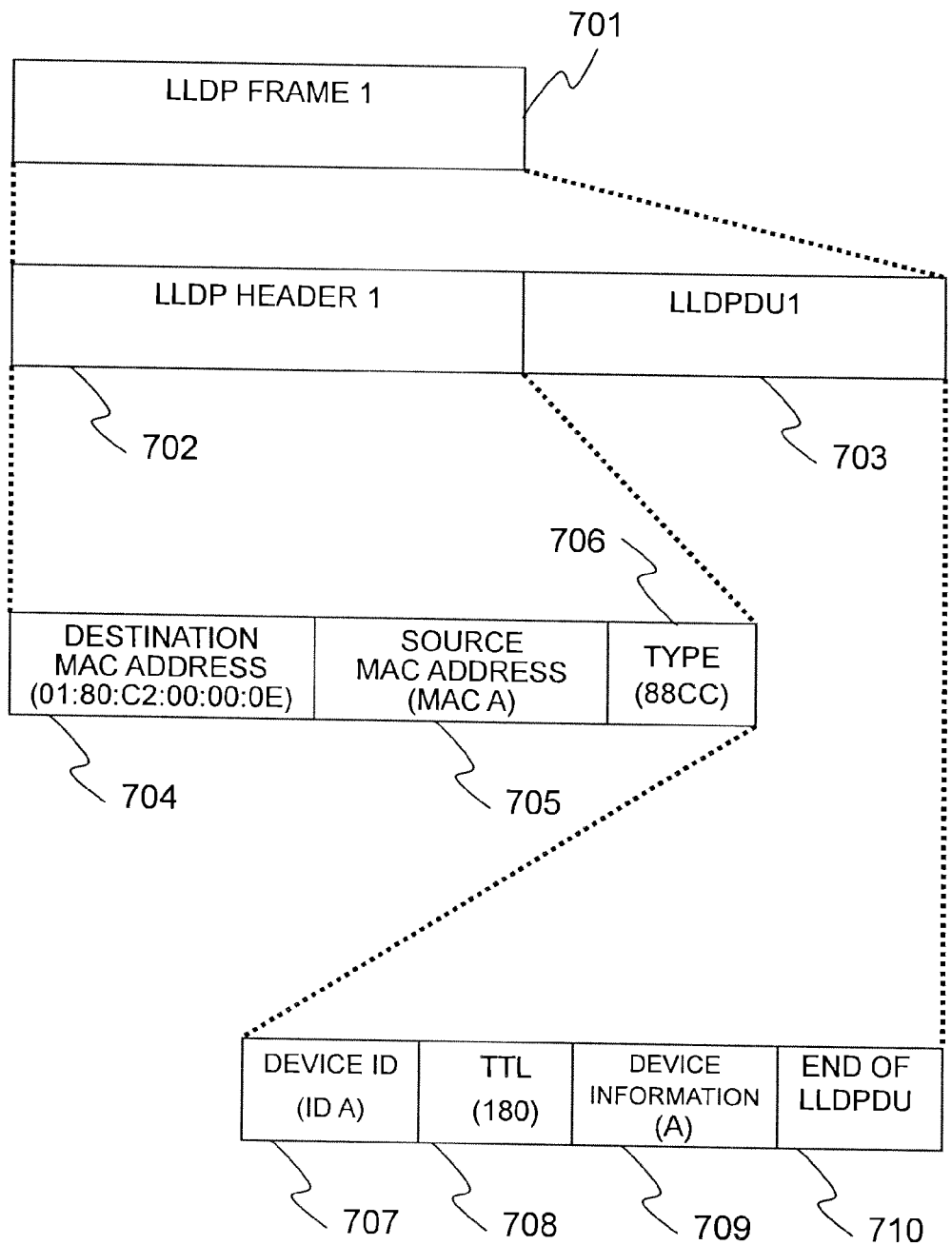
FIG. 10 shows an example of the LLDP frame sent by the terminal A in the invention.
Figure 11A:
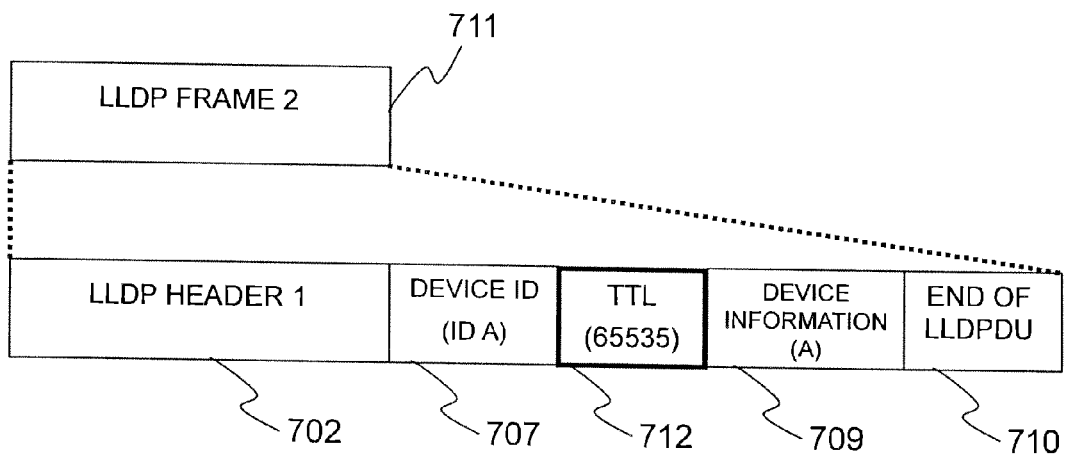
FIGS. 11A and 11B show an example of the LLDP frame in which a TTL is converted by the frame transfer apparatus in the invention.
Figure 11B:
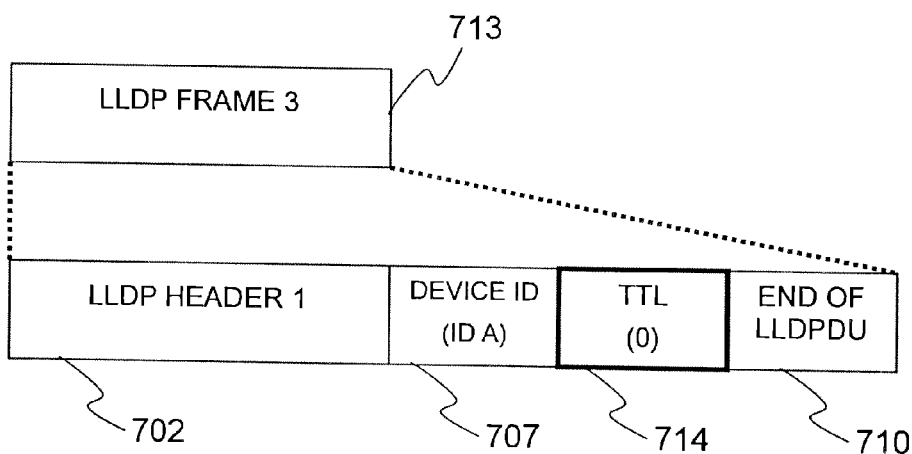
Figure 12A:
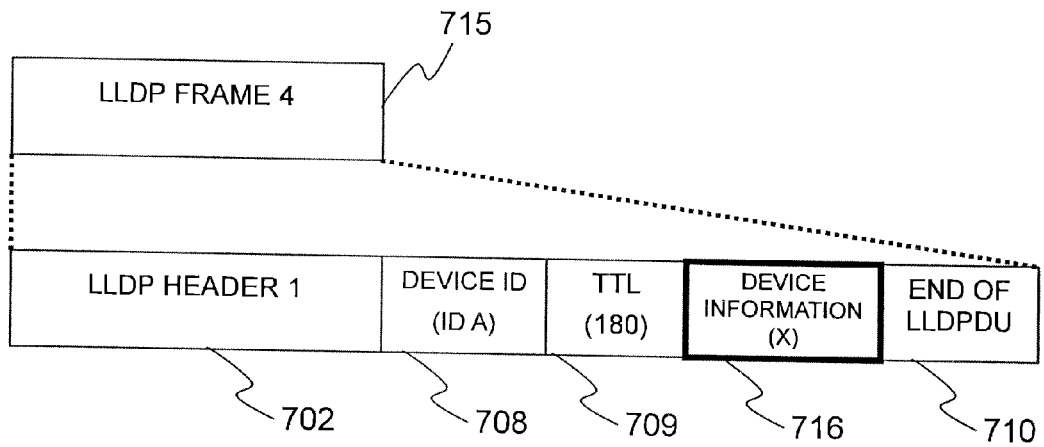
FIGS. 12A and 12B show an example of the LLDP frame in updating the information of the LLDP frame in the invention.
Figure 12B:
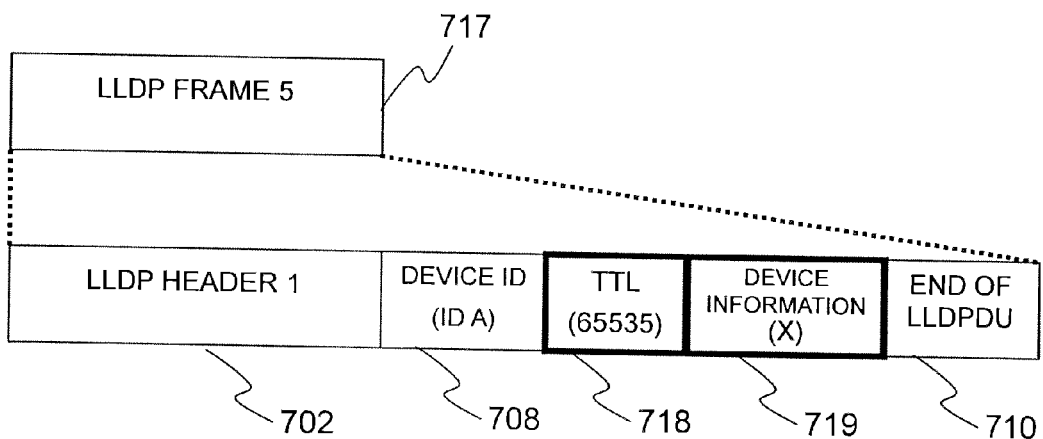

In FIG. 8, if the terminal A102 is started (601), the terminal A102 sends an LLDP frame 1 (701) in which its own device information 107 is set to the connected frame transfer apparatus 101 (602). At this time, the terminal A102 sets a TTL 708 of the LLDP frame 1 (701). In FIGS. 8 and 10, as an instance, the TTL is set to 180 seconds. The frame transfer apparatus 101 having received the LLDP frame 1 (701) from the terminal A102 stores the information of the LLDP frame 1 (701) as the new entry in the device information table 304. Also, the frame is transferred to the terminal B103 (603). On this occasion, an LLDP frame 2 (711) in which the TTL 708 of the LLDP frame 1 (701) is converted to the maximum value (65535 seconds) is sent. Thereby, the terminal B103 having received the LLDP frame 2 (711) does not need to receive the LLDP frame for survival confirmation of the terminal A102 for 65535 seconds (604). Also, the frame transfer apparatus 101 sends in unicast the LLDP frame including the device information of other than the concerned terminal internally held to the terminal A102 newly joining the network. In FIG. 8, the frame transfer apparatus sends the device information of entry No 2 (409) and entry No 3 (410) internally held to the terminal A102 (605).

The terminal A102 periodically sends the LLDP frame 1 (701) at a sending period shorter than the TTL (180 seconds) set by itself (607). In FIG. 8, as an instance, the sending period of the terminal A102 is 120 seconds (606). Every time of receiving the LLDP frame 1 (701) from the terminal A102, the frame transfer apparatus 101 compares it with the information held in the device information table 304. On this occasion, if the received LLDP frame is not changed, the LLDP frame 1 (701) is not transferred (607). Thereby, it is possible to suppress the traffic load of the LLDP frame periodically sent by the terminal A102 within the network.

Also, because the LLDP frame 2 (711) transferred by the frame transfer apparatus 101 expires in the effective term after the elapse of 65535 seconds, the frame transfer apparatus 101 sends as proxy the LLDP frame 2 (711) in place of the terminal A102. The frame transfer apparatus 101 sets up the sending timer 407 in sending the LLDP frame 2 (711), and sends as proxy the LLDP frame 2 at a moment of expiration of the set time (609). In FIG. 8, the sending timer is set to 65500 seconds (608). Thereby, the terminal B103 receiving the LLDP frame 2 (711) can make the survival confirmation of the terminal A102.

The frame transfer apparatus sets up the TTL timer 406 from the TTL 708 set in the received LLDP frame 1 (701). In FIG. 8, since the TTL 708 of the LLDP frame 1 (701) is 180 seconds, the TTL timer 406 is set to 180 seconds (611). If the LLDP frame is not sent from the terminal A102 for the reason that the terminal A102 secedes from the network (610) or the like, the frame transfer apparatus 101 deletes the concerned entry from the device information table 304 at a moment of expiration of the TTL timer of 180 seconds. Also, the frame transfer apparatus 101 sends as proxy an LLDP frame 3 (713) in which the TTL is set to 0 to the terminal B (612). Thereby, it is possible to notify the disconnection of the terminal A from the network to the terminal B103.

Referring to FIG. 9, an LLDP frame transfer sequence where the device information of the terminal A102 is updated will be described below.

As previously described, the frame transfer apparatus 101 having received the LLDP frame 1 (701) from the terminal A102 does not transfer the LLDP frame to the terminal B103, if the device information of the received LLDP frame is not changed (621). However, with a setting change (622) of the terminal A, if device information 716 of the LLDP frame from the terminal A102, like an LLDP frame 4 (715), is changed (623), the frame transfer apparatus 101 updates the device information 405 of the concerned entry in the device information table 304, and sends an LLDP frame 5 (717) to the terminal B103 (624). On this occasion, the TTL set in the LLDP frame 5 (717) is also changed to the maximum value of 65535 seconds. Thereby, it is possible to promptly notify the change of the device information of the terminal A102 to the terminal B103 as well. Also, in sending the LLDP frame 5 (717), the sending timer 407 of the LLDP frame at the next time is set up (625), and the LLDP frame 5 (717) is sent as proxy at a moment of expiration of the sending timer (626).

In FIG. 9, due to stop of the terminal A (627), if the frame transfer apparatus 101 receives the LLDP frame 3 (713) in which the TTL is set to 0 (628), the frame transfer apparatus deletes a concerned entry 408 in the device information table 304. Also, the LLDP frame 3 (713) is sent to the terminal B103. Thereby, it is possible to notify the stop of the terminal A102 to the terminal B103 as well.

Though in the above embodiment there is one frame transfer apparatus, plural frame transfer apparatuses may be provided within the network. In this case, each network device may be configured in the above way, or part of the plural frame transfer apparatuses within the network may be configured in the above way.

With the frame transfer apparatus of this embodiment, the LLDP frame is transferred by changing the TTL of the LLDP frame for transfer to the maximum value of 65535 seconds, whereby it is possible to reduce the traffic load of the concerned LLDP frame periodically sent within the network. Also, in the frame transfer apparatus, when the TTL of the concerned LLDP frame expires, the LLDP frame in which the TTL is set to 0 is sent as proxy, whereby it is possible to appropriately notify the disconnection of the concerned terminal from the network to the other terminals. Also, the device information of other than the concerned terminal within the frame transfer apparatus is sent in unicast to the terminal newly joining the network, whereby the terminal newly joining the network can also promptly acquire the device information within the network.

In this embodiment, since the transfer operation of the frame transfer apparatus within the network is only changed, it is unnecessary to make changes on the conventional sending and receiving side terminals. Therefore, this embodiment is easy to apply to an already existing system using the LLDP. Also, if the plural frame transfer apparatuses exist within the network, this embodiment is applied to all the frame transfer apparatuses, whereby it is possible to obtain the effect of suppressing the traffic load extremely. However, when this embodiment is applied to one frame transfer apparatus within the network, it is also possible to suppress the traffic load within the network. Therefore, it can be said that the frame transfer apparatus and the frame transfer method of this embodiment have high practicality.

(Modification)

Though in the above embodiment, the network for sending the device information using the LLDP has been exemplified, the network may send the frame for survival confirmation of the terminal, rather than sending the device information. For example, the device information of the above embodiment may not be contained, and the above LLDP frame may be the frame for survival confirmation.

A frame transfer apparatus of this modification example is, for example, an apparatus in a network in which a device that is a terminal or the frame transfer apparatus in the network sends a frame for a survival confirmation of its own, and each device acquires the frame for the survival confirmation of the other devices transferred by the frame transfer apparatus, the frame transfer apparatus comprising:

a receiving section for receiving a first frame including a predetermined first effective time of the survival conformation from a first device;

a monitor section for confirming a survival of the first device by receiving the first frame again from the first device within the first effective time; and a sending section for sending a second frame including a second effective time of the survival conformation that is longer than the first effective time to one or more second devices at time interval longer than the first effective time and shorter than the second effective time while the survival of the first device is confirmed.

Industrial Applicability

The present invention is applicable to a network system for transmitting the device information in multicast, for example.

What is claimed is:

1. A frame transfer apparatus in a network in which a device that is a terminal or the frame transfer apparatus within the network sends its own device information and each device acquires the device information of the other devices transferred by the frame transfer apparatus, the frame transfer apparatus comprising:

a receiving section for receiving a first frame including the device information of a first device and a predetermined first effective time of the device information from the first device;

a storage section for storing the device information of the first device and the first effective time in the received first frame;

a monitor section for confirming a survival of the first device by receiving the first frame again from the first device within the first effective time; and a sending section for sending a second frame including the device information of the first device and a second effective time that is longer than the first effective time to one or more second devices at time interval longer than the first effective time and shorter than the second effective time while the survival of the first device is confirmed.

2. The frame transfer apparatus according to claim 1, wherein
if the monitor section detects that the first frame is not received again from the first device within the first effective time, the sending section sends a third frame in which the effective time of the device information is set to 0 to the one or more second devices.

3. The frame transfer apparatus according to claim 1, wherein
the second effective time is the maximum value of the effective time settable in the network.

4. The frame transfer apparatus according to claim 1, wherein
if the receiving section receives a fourth frame including new device information in which the device information of the first device is changed from the first device, the sending section sends, regardless of the time interval, a fifth frame including the new device information and the second effective time to the one or more second devices at an earlier timing than next sending timing based on the time interval.

5. The frame transfer apparatus according to claim 4, wherein
the first and fourth frames further include identification information of the first device, and
the receiving section detects a change in the device information by managing the device information of the first device associated with the identification information of the first device in the storage section.

6. The frame transfer apparatus according to claim 1, wherein
if the receiving section receives a sixth frame including the device information of a third device and a predetermined third effective time of the device information from the third device newly connected, the frame transfer apparatus stores the device information of the third device and the third effective time in the received sixth frame into the storage section, and sends the device information of other than the third device that is stored in the storage section to the third device.

7. The frame transfer apparatus according to claim 6, wherein
the first frame further includes identification information of the first device,
the sixth frame further includes the identification information of the third device,
wherein when the receiving section receives the first frame, the frame transfer apparatus stores the device information of the first device in the storage section and when the receiving section receives the sixth frame, the frame transfer apparatus judges that the third device is a newly connected device if the identification information of the third device is not stored in the storage section.

8. The frame transfer apparatus according to claim 1, wherein
the storage section has a device information table in which the identification information of the first device, the device information of the first device, the first effective time and the time interval are correspondingly stored.

9. A frame transfer apparatus in a network in which a device that is a terminal or the frame transfer apparatus in the network sends a frame for a survival confirmation of its own, and each device acquires the frame for the survival confirmation of the other devices transferred by the frame transfer apparatus, the frame transfer apparatus comprising:
a receiving section for receiving a first frame including a predetermined first effective time of the survival conformation from a first device;
a monitor section for confirming a survival of the first device by receiving the first frame again from the first device within the first effective time; and
a sending section for sending a second frame including a second effective time of the survival conformation that is longer than the first effective time to one or more second devices at time interval longer than the first effective time and shorter than the second effective time while the survival of the first device is confirmed.

10. A frame transfer method in a network in which a device that is a terminal or the frame transfer apparatus within the network sends its own device information and each device acquires the device information of the other devices transferred by the frame transfer apparatus, the frame transfer method comprising the steps of:
receiving a first frame including the device information of a first device and a predetermined first effective time of the device information from the first device;
storing the device information of the first device and the first effective time in the received first frame;
confirming a survival of the first device by receiving the first frame again from the first device within the first effective time; and
sending a second frame including the device information of the first device and a second effective time that is longer than the first effective time to one or more second devices at time interval longer than the first effective time and shorter than the second effective time while the survival of the first device is confirmed.

* * * * *